N. E. HINDS.
Improvement in Fruit Gatherers.
No. 124,743. Patented March 19, 1872.
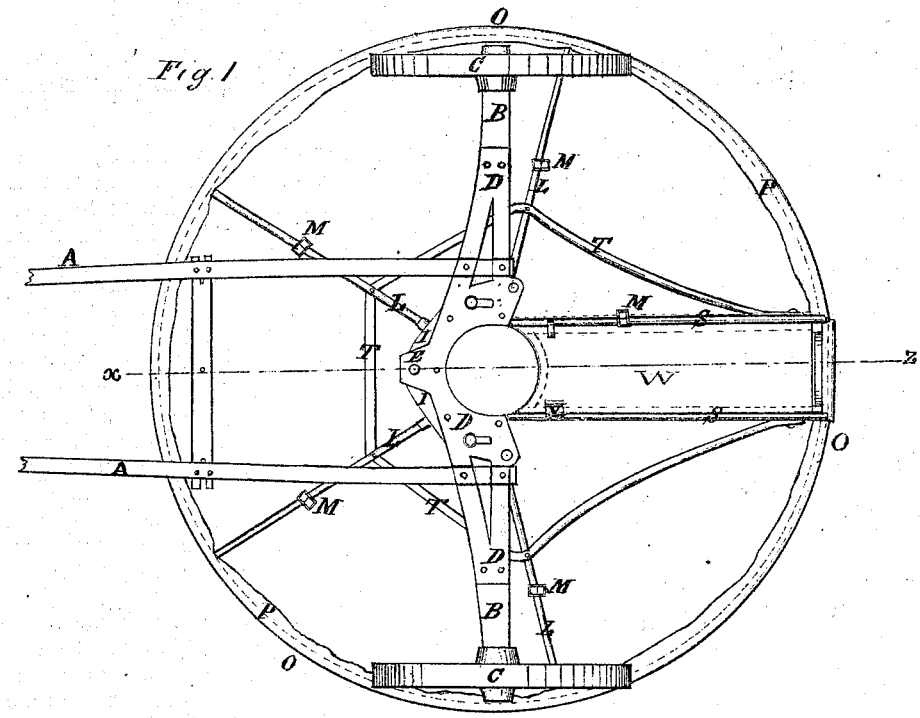
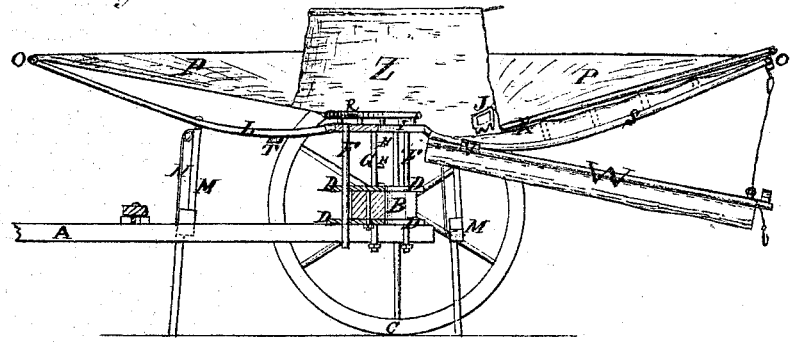
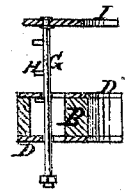
Witnesses
H. S. Miller
D. R. Howl
N. E. Hinds, Inventor.
by Cox & Cox
his Attorneys.

UNITED STATES PATENT OFFICE.

NEHEMIAH E. HINDS, OF COOPERSTOWN, NEW YORK.

IMPROVEMENT IN FRUIT-GATHERERS.

Specification forming part of Letters Patent No. 124,743, dated March 19, 1872; antedated March 7, 1872.

*To all whom it may concern:*

Be it known that I, N. E. HINDS, of Cooperstown, county of Otsego and State of New-York, have invented a new and useful Apparatus for Gathering Apples, Fruit, Nuts, &c.

Nature and Objects of the Invention.

The invention relates to that class of fruit-gatherers which consist of a frame covered with canvas or other suitable material, and provided with a spout or channel, by means of which the fruit is conveyed into receptacles; the frame being so arranged as that all the fruit falling upon the canvas will pass into the spout; and mounted upon an axle and wheels, and provided with sliding standards and elongating supports, by means of which it can be elevated or lowered; the device being constructed so that it can receive the bole of the tree in its center. The object of the invention is to provide a means of rapidly gathering fruit, and prevent its being injured by falling upon or coming in contact with hard substances or the ground in the operation.

Description of the Accompanying Drawings.

Figure 1 is a top view of the invention, the canvas being removed. Fig. 2 is a vertical central longitudinal section through the line *x z;* Fig. 3, vertical sectional view, showing standard G; Fig. 4, same of support M.

General Description.

A in the accompanying drawings are the thills, secured to the axle B, which is provided with the wheels C. The center of the axle is of proper width, and has a concave opening facing to the rear. A plate of metal, D, the superficies of which correspond with the upper and under surfaces of the central parts of the axle, and having an ear, E, projecting forward from the center of the plate, is bolted to said surfaces. At each side of the plates D, adjacent to the rear end of each shaft, and also through the ears E and opposite each other, are circular apertures, through which the slide-standards F pass. In front of the two rear apertures are provided two others in each plate opposite each other, circular in front, with a rectangular opening at the rear. Through the circular parts of these apertures pass the supporting slide-standards G, which are provided at proper intervals on the same side with studs H of such size as to pass through the rectangular portion of the apertures below. At this place the material composing the axle is open, but covered above and below by the plates D. The use of the standards G is to secure the device at a fixed height from the ground, the studs H resting upon the adjacent parts of the plate D. The upper ends of the standards G are journaled in, and the corresponding parts of the standards F rigidly attached to, the plate I near its periphery, the plate being placed directly above the plates D, and provided with a concave opening, the plane of which corresponds vertically with that of the concave opening in the axle. The exterior periphery of the plate I is provided with radial arms L curving upward; in the present instance four being used. One extremity of each of these arms is attached to the periphery of the plate I—one on each side of the same, midway between the standards F and G, the other extremity of the arm coming above and in rear of the hub of the wheel. The other two arms are attached to the outer edge of the plate I, about midway between the front standard F and the sliding standards G, and so radiate as that their outer extremities are in the same circle and horizontal plane with those arms first mentioned, and these extremities are equidistant from each other. All of the arms L have a common curve upward, and, midway between their junction with the plate I and their outer ends, are provided with the extension supports M, which are rigidly affixed to and project downward from the same. These supports consist of two rectangular bars, each provided at opposite ends with a fixed sleeve, in which the bars slide. They also have common perforations at regular intervals, the base of the support having attached to it one end of a spring-catch, N, the other end of which has a projection, which can pass through the aperture in one bar into one of the apertures in the other, thereby locking the two at any desired point. The outer ends of the arms L are secured to the circular rim O, to which the circumference of a circular piece of cloth or canvas, P, is attached. Immediately above and in proper proximity to the concave opening in the plate I, and secured in such position by short standards, is placed a curved bar, R, the concavity of which corresponds, as to size, direction, and plane, with that in the plate I. To the bar R, the horizontal plane of which is a proper distance below that of the rim O, the central part of the canvas P is secured, which, being tightly stretched between plate and rim, inclines from circumference to center. Rearward from each side of the opening in the plate I extends an arm, S, similar in construction to the arm L, the outer extremities being attached to the extremities of the rim O, that portion of which between the outer ends of the arms S being removed. A section of the canvas is also cut away, the edges whereof are secured to the arms S. Thus an opening is made in the rear of the device from circumference to center. One of the arms S is provided similarly to the arm L with the support M. At a proper distance between the support M and the rim O is secured to the arm S one extremity of the frame T, which extends from that point forward, passing under the side arm L, to which it is fastened a short distance inside the support M; thence, extending forward and laterally, it passes over and is attached to the front arms L at a point midway between the supports M and plate I, being arranged on each side the same. A frame, W, the width of which corresponds with the distance between the arms S, is secured on one side near its front to the arm S, near the junction thereof with the plate I, by a swivel, V, on which the frame swings. This frame consists of a curved bar in front, the curve of which is the same as that of the concavity in the plate I, below and opposite which it is placed. The front ends of the straight bars, forming the sides of the frame, are attached to this curved bar, the opposite ends of side bars being connected by an arched bar, the convexity of which is upward. To the sides and front of this frame canvas or other cloth is so secured as to "sag," thus forming a channel between the sides of the frame. A hook in the arm S supports the side of the frame W opposite the swivel V, the rear end of the frame being so upheld by cords attached to the rim O as to be properly inclined from front to rear. An apron, X, one side of which is secured to the canvas P, the other two sides to two sides of an oblong rectangular frame swinging upon an eyebolt immediately above the junction of the arm S and rim O, and secured on a pin directly opposite, which apron extends forward so as to reach one edge of the collar Z, thus covering, with the exception of an opening about equal to its width, the opening between the arms S, and inclining toward the center. About the aperture in the center of the device is placed a cloth or canvas collar, Z, which is open at the rear, but closed on three sides, its lower edge, save at the rear, being secured to the canvas P, its upper edge having a draw-cord. The rear edges of the collar are loose, and so arranged as to fold one over the other. To one of these parts, near its under side and on its inner surface, is the open concave plate J, provided with pointed projections, which project below the lower loose edge of the collar. The concavity of this plate is intended to conform to that of the collar, its purpose being to secure the loose ends of the collar between the bole of the tree and the front edge of the frame W.

Operation.

The device is so placed that the bole of the tree from which the fruit is to be gathered stands in the circular aperture in the center of the machine. The supports M are then adjusted so as to allow the fruit the shortest possible fall, and the frame O, sliding upon the slide and revolving standards F and G, is elevated or lowered to the desired position, the standards G being so turned that the studs H rest upon the plate D to assist in supporting receiver. The collar Z is now drawn to the tree, the plate J being inserted between the tree and the front of the frame W, which is lowered to the desired position and there secured by cords at its mouth. The apron X is now lowered over the aperture between the arms S, and secured by the pin at the end of one thereof. The tree may now be shaken by a cord previously attached, or a pole. The fruit, falling upon the canvas covering or upon the apron X, rolls to the center; thence about the collar Z, which prevents it coming in contact with the bole of the tree; finally entering the aperture between the front of the apron and the rear of the collar, it falls upon and passes down the spout or frame W into a basket or receptacle placed below the mouth of the spout to receive the fruit.

It being desired to move the device, it is only necessary to loosen and raise the frame W and apron X, raise the plate J, and untie the cord at the mouth of the collar, opening the same. The supports M should also be shortened so as to not touch the ground.

Claims.

What I claim as my invention, and desire to secure by Letters Patent, is—

1. The axle B, provided with the plates D, both axle and plates having a common channel opening toward the rear, as shown and described.

2. The axle herein described, in combination with the slide-standards F, the slide and revolving standards G, and the plate I, when arranged and operated for the uses and purposes shown and described.

3. The combination of the axle B, standards F and G, plate I, and supports M for the uses and purposes described and shown.

4. The combination of the plate I, radial arms S and L, frames O and T, bar or plate R, and canvas P, as herein shown and described.

5. The combination of the plate I, radial arms S and L, frames O and T, bar or plate R, and canvas P with the collar Z, apron X, and frame W, substantially as shown and described.

6. The combination of the plate I, standards F and G, radial arms L and S, rim O, plate R, frames O and T, collar R, apron X, and frame W, when arranged and used as and for the uses and purposes specified.

7. The supports M, provided with the spring-catch N, as herein used and applied.

N. E. HINDS.

Witnesses:
CHANCEY N. DRAKE,
HENRY C. HINDS.